(12) United States Patent
Tseng et al.

(10) Patent No.: US 10,713,402 B1
(45) Date of Patent: *Jul. 14, 2020

(54) MOLDING SYSTEM FOR PREPARING INJECTION-MOLDED ARTICLE

(71) Applicant: CORETECH SYSTEM CO., LTD., Chupei, Hsinchu County (TW)

(72) Inventors: Huan-Chang Tseng, Chupei (TW); Rong-Yeu Chang, Chupei (TW); Chia-Hsiang Hsu, Chupei (TW)

(73) Assignee: CORETECH SYSTEM CO., LTD., Chupei, Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/723,099

(22) Filed: Dec. 20, 2019

Related U.S. Application Data

(60) Provisional application No. 62/886,530, filed on Aug. 14, 2019.

(51) Int. Cl.
*G06F 30/28* (2020.01)
*B29C 45/77* (2006.01)
*G06F 113/08* (2020.01)
*G06F 113/22* (2020.01)
*G06F 113/10* (2020.01)

(52) U.S. Cl.
CPC .............. *G06F 30/28* (2020.01); *B29C 45/77* (2013.01); *G06F 2113/08* (2020.01); *G06F 2113/10* (2020.01); *G06F 2113/22* (2020.01)

(58) Field of Classification Search
CPC .. G06F 30/28; G06F 2113/08; G06F 2113/22; G06F 2113/10; B29C 45/77

USPC .......................................................... 526/114
See application file for complete search history.

(56) References Cited

U.S. PATENT DOCUMENTS 9,919,465 B1 * 3/2018 Tseng ...................... B29C 45/77
10,201,921 B1 * 2/2019 Tseng ...................... B29C 45/77
(Continued)

OTHER PUBLICATIONS

Chang et al., "Numerical simulation of mold filling in injection molding using a three-dimensional finite volume approach," International Journal for Numerical Methods in Fluids, vol. 37, Issue 2, pp. 125-148 (2001), 24 pages.

*Primary Examiner* — William K Cheung
(74) *Attorney, Agent, or Firm* — Muncy, Geissler, Olds & Lowe, P.C.

(57) ABSTRACT

The present disclosure provides a molding system for preparing an injection-molded article. The molding system includes a molding machine; a mold disposed on the molding machine and having a mold cavity for being filled with a molding resin; a processing module configured to generate an extension rate distribution and a shear rate distribution of the molding resin in the mold cavity based on a molding condition for the molding machine; and a controller coupled to the processing module. The processing module is configured to generate the extension rate distribution and the shear rate distribution of the molding resin based in part on consideration of a geometry variation of the mold cavity. The controller is configured to control the molding machine with the molding condition using the generated extension rate distribution and the generated shear rate distribution of the molding resin to perform an actual molding process for preparing the injection-molded article.

10 Claims, 7 Drawing Sheets

(56) References Cited

U.S. PATENT DOCUMENTS

| | | | |
|---|---|---|---|
| 10,377,066 B1* | 8/2019 | Tseng | B29C 45/0005 |
| 2010/0169062 A1* | 7/2010 | Linn | G06F 30/20 |
| | | | 703/2 |

* cited by examiner

MOLDING SYSTEM FOR PREPARING INJECTION-MOLDED ARTICLE

CROSS-REFERENCE TO RELATED APPLICATION

This patent application claims priority under 35 U.S.C. § 119(e) from Provisional Patent Application No. 62/886,530, filed on Aug. 14, 2019, the disclosure of which is incorporated by reference herein in its entirety, including all exhibits appended to Provisional Patent Application No. 62/886,530.

TECHNICAL FIELD

The present disclosure relates to a molding system for preparing an injection-molded article, and more particularly, to an injection-molding system for preparing an injection-molded article using a computer-aided engineering (CAE) simulation.

DISCUSSION OF THE BACKGROUND

In plastics manufacturing, the actual flow of polymer melts is transient, non-Newtonian and non-isothermal, with frozen layers building up as the complex mixture flows through the mold cavity. Characteristics of a finished product are determined by many complex factors, such as changes in the direction of flow, inclusion of ribs, and changes in thickness and holes. To control the quality of the products, a deep understanding of complicated flow fields is critical. Nowadays, CAE (computer-aided engineering) software provides realistic simulation and predictive analysis for complex flows of complex fluids.

According to results of academic research of fluid mechanics and rheology, a strain rate that indicates a rate of deformation of a material with respect to time plays an essential role in the physics of fluids. Strain contains shear and extension deformations. As a rule, both have been separately investigated.

In practice, a complex geometric channel flow is a combination of shear flow and extension flow. For the complex flow, a generalized strain rate that can be determined with certainty is widely applied in the CAE tool. Flows in injection molding are dominated by shear flows, but extension flows are encountered, such as the contraction flow at gate and nozzle regions, and the fountain flow of a melt front in the cavity. However, the generalized strain rate is not decomposed into individual rates of shear and extension. To resolve such significant issue, the present invention proposes the principal shear rate and principal extension rate to be obtained from the generalized strain rate. In addition, a new quantity is defined to show the degree of shear and extension variance with respect to flow geometric features. This is based on extensive research of complicated flow phenomena related to shear and extension.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

The present disclosure provides a molding system for preparing an injection-molded article, comprising: a molding machine; a mold disposed on the molding machine and having a mold cavity for being filled with a molding resin; a processing module configured to generate an extension rate distribution and a shear rate distribution of the molding resin in the mold cavity based on a molding condition for the molding machine, wherein the extension rate distribution and the shear rate distribution of the molding resin are generated based in part on consideration of a geometry variation of the mold cavity; and a controller coupled to the processing module and configured to control the molding machine with the molding condition using the generated extension rate distribution and the generated shear rate distribution of the molding resin to perform an actual molding process for preparing the injection-molded article.

In some embodiments, the processing module is configured to generate the extension rate distribution and the shear rate distribution of the molding resin based in part on consideration of a velocity distribution of the molding resin in the mold cavity.

In some embodiments, the processing module is configured to generate the extension rate distribution and the shear rate distribution of the molding resin in a principal flow coordinate system, and the velocity distribution of the molding resin in the mold cavity in a Cartesian coordinate system.

In some embodiments, the processing module is configured to generate a rate-of-deformation distribution of the molding resin in the Cartesian coordinate system based in part on consideration of the velocity distribution due to a geometry variation of the mold cavity.

In some embodiments, the processing module is configured to transform the rate-of-deformation distribution of the molding resin in the Cartesian coordinate system into a rate-of-deformation distribution of the molding resin in the principal flow coordinate system.

In some embodiments, the rate-of-deformation distribution of the molding resin in the Cartesian coordinate system is represented by an expression:

$$D = \begin{bmatrix} d_{11} & d_{12} & d_{13} \\ d_{12} & d_{22} & d_{23} \\ d_{13} & d_{23} & d_{33} \end{bmatrix}$$

wherein the processing module is configured to generate the rate-of-deformation distribution of the molding resin in the principal flow coordinate system by an expression:

$$D^* = RDR^T = \begin{bmatrix} d_{11}^* & d_{12}^* & d_{13}^* \\ d_{12}^* & d_{22}^* & d_{23}^* \\ d_{13}^* & d_{23}^* & d_{33}^* \end{bmatrix}$$

where $R$ and $R^T$ represent coordinate transfer matrixes represented by an expression:

$$R = \begin{bmatrix} t \\ n \\ b \end{bmatrix}$$

$$RR^T = R^T R = I = \begin{bmatrix} 1 & 0 & 0 \\ 0 & 1 & 0 \\ 0 & 0 & 1 \end{bmatrix}$$

where t is a unit tangent vector, n is a unit normal vector, and b is a unit bi-normal vector.

In some embodiments, the unit tangent vector, the unit normal vector, and the unit bi-normal vector are represented by an expression:

$$t = \frac{v}{|v|}$$
$$n = \frac{dv/ds}{|dv/ds|}$$
$$b = t \times n$$

where v is a flow velocity vector indicating the tangent direction of flow streamline, and dv/ds is a direction of velocity changes along the arc of flow streamline.

In some embodiments, the processing module is configured to divide the rate-of-deformation distribution of the molding resin in the principal flow coordinate system into the extension rate distribution and the shear rate distribution of the molding resin represented by an expression:

$$D^* = S^* + E^*$$

$$S^* = \begin{bmatrix} 0 & d_{12}^* & d_{13}^* \\ d_{12}^* & 0 & d_{23}^* \\ d_{13}^* & d_{23}^* & 0 \end{bmatrix}$$

$$E^* = \begin{bmatrix} d_{11}^* & 0 & 0 \\ 0 & d_{22}^* & 0 \\ 0 & 0 & d_{33}^* \end{bmatrix}$$

$$\dot{\gamma}_S^* = \sqrt{2S^* : S^*}$$
$$\dot{\gamma}_E^* = \sqrt{2E^* : E^*}$$

where $\dot{\gamma}_S^*$ is the shear rate distribution and $\dot{\gamma}_E^*$ is the extension rate distribution.

In some embodiments, the processing module is configured to generate an extension fraction (EF) indicator represented by an expression:

$$EF = \frac{(\dot{\gamma}_E^*)^2}{(\dot{\gamma}_S^*)^2 + (\dot{\gamma}_E^*)^2}$$

In some embodiments, the processing module is configured to generate the extension rate distribution and the shear rate distribution of the molding resin based in part on consideration of a rate-of-deformation distribution of the molding resin due to the geometry variation of the mold cavity.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures.

DETAILED DESCRIPTION

Figure 1:
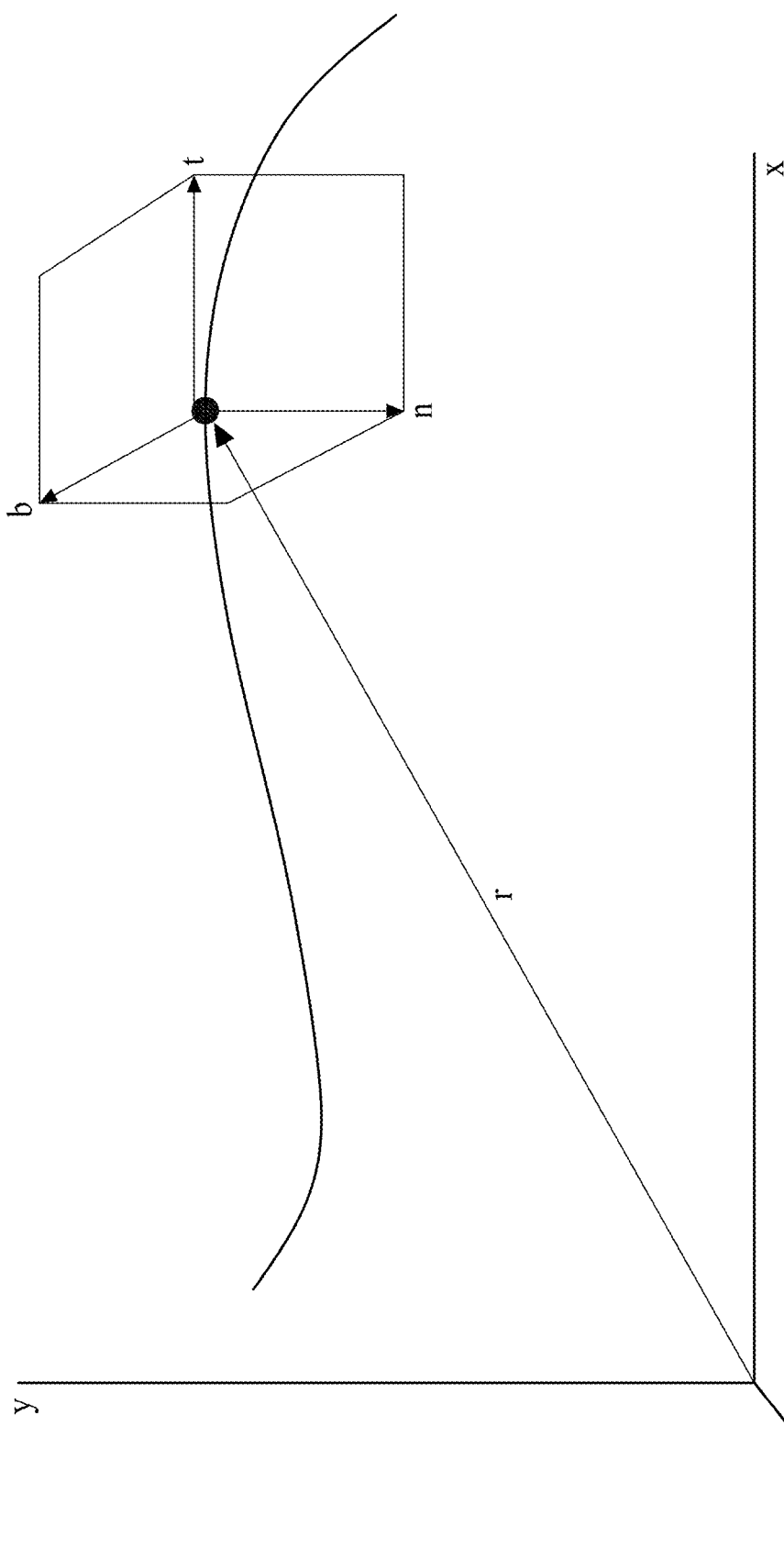
FIG. 1 is a schematic diagram showing the coordinate transformation in accordance with some embodiments of the present disclosure.

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral.

It shall be understood that, although the terms first, second, third, etc. may be used herein to describe various elements, components, regions, layers or sections, these elements, components, regions, layers or sections are not limited by these terms. Rather, these terms are merely used to distinguish one element, component, region, layer or section from another element, component, region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limiting to the present inventive concept. As used herein, the singular forms "a," "an" and "the" are intended to include the plural forms as well, unless the context clearly indicates otherwise. It shall be understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

In injection/compression molding, the flow of molding resin (polymer melts) is transient, non-Newtonian and non-isothermal, with frozen layers building up as the complex mixture flows through the mold cavity. The governing equations of the fluid mechanics include the equation of continuity, the equation of motion, and the equation of energy to describe the transient and non-isothermal flow motion are as follows:

$$\frac{\partial \rho}{\partial t} + \nabla \cdot \rho v = 0 \qquad (1)$$

$$\frac{\partial}{\partial t}(\rho v) + \nabla \cdot (\rho v v) = -\nabla P + \nabla \cdot \tau + \rho g \qquad (2)$$

$$\rho C_P \left( \frac{\partial T}{\partial t} + v \cdot \nabla T \right) = \nabla \cdot (k \nabla T) + \eta \dot{\gamma}^2 \qquad (3)$$

where $\rho$ is the density; v is the velocity vector; t the time; $\tau$ is the extra stress tensor; $\nabla v$ is the velocity gradient tensor; g is the acceleration vector of gravity; p is the pressure; $C_p$ is the specific heat; T is the temperature; k is the thermal conductivity; $\eta$ is the shear viscosity; and $\dot{\gamma}$ is the strain rate.

The extra stress tensor $\tau$ is defined by the generalized Newtonian fluid (GNF) model for polymer fluids, $$\tau = 2\eta(T, P, \dot{\gamma}) D \qquad (4)$$

In general, the Cross-William-Landel-Ferry (Cross-WLF) flow curve model has been used to describe the shear viscosity $\eta$ as a function of the temperature T, pressure P, and strain rate $\dot{\gamma}$.

The velocity gradient tensor $\nabla v$ is given:

$$\nabla v = \begin{bmatrix} \frac{\partial v_x}{\partial x} & \frac{\partial v_x}{\partial y} & \frac{\partial v_x}{\partial z} \\ \frac{\partial v_y}{\partial x} & \frac{\partial v_y}{\partial y} & \frac{\partial v_y}{\partial z} \\ \frac{\partial v_z}{\partial x} & \frac{\partial v_z}{\partial y} & \frac{\partial v_z}{\partial z} \end{bmatrix} \qquad (5)$$

In addition, the rate-of-deformation tensor D is the symmetric tensor of $\nabla v$:

$$D = \frac{\nabla v + \nabla v^T}{2} \qquad (6)$$

The strain rate $\dot{\gamma}$ is the magnitude of the tensor D as an indicator of the rate of deformation of a material with respect to time:

$$\dot{\gamma} = \sqrt{2D:D} \qquad (7)$$

According to the fundamental research of fluid mechanics and rheology, the strain contains both basic deformations of shear and extension. Shear rate is defined in simple shear.

Considering the shear flows that have only one non-vanishing velocity component that varies along only one direction, we state the following generally accepted convention: Direction "x" or "1" is the velocity component direction, Direction "y" or "2" is the direction along which the velocity changes, and Direction "z" or "3" is the neutral direction of thickness and gradient. For the simple shear flow with the kinematics given by $v_1 = \dot{\gamma}_{13}$, $v_2 = 0$, and $v_3 = 0$, the tensor D is obtained:

$$D = \begin{bmatrix} 0 & 0 & \frac{\dot{\gamma}_{13}}{2} \\ 0 & 0 & 0 \\ \frac{\dot{\gamma}_{13}}{2} & 0 & 0 \end{bmatrix} \qquad (8)$$

where the strain rate $\dot{\gamma}$ reduces to $\dot{\gamma}_S$, namely, called shear rate, $\dot{\gamma} = \dot{\gamma}_S = \dot{\gamma}_{13}$, which refers to off-diagonal components of the tensor D.

For incompressible fluid, another important class of fluid flow is the extension (or elongation) flow, which refers to diagonal components of the tensor D, $$D = \dot{\varepsilon}_{11} \begin{bmatrix} 1 & 0 & 0 \\ 0 & a & 0 \\ 0 & 0 & -(1+a) \end{bmatrix} \qquad (9)$$

where $\dot{\varepsilon}_{11}$ is a positive extension value along the 1-axis; the parameter a can describe three extension types: a=-0.5 for uniaxial extension, a=0 for planar extension, and a=1 for biaxial extension. Due to extension deformation, the strain rate $\dot{\gamma}$ reduces to $\dot{\gamma}_E$, namely, extension rate; $\dot{\gamma} = \dot{\gamma}_E$: the uniaxial extension rate $\dot{\gamma}_{UE} = \sqrt{3}\dot{\varepsilon}_{11}$, the planar extension rate $\dot{\gamma}_{PE} = 2\dot{\varepsilon}_{11}$, and the biaxial extension rate $\dot{\gamma}_{BE} = 2\sqrt{3}\dot{\varepsilon}_{11}$.

According to the aforementioned descriptions, it is essential for the shear and extension deformation directions to be "preliminarily" defined in the global coordinates. For the complex geometric channel flow consisting of a combination of shear flow and extension flow the rate-of-deformation tensor D is a non-zero-value filled matrix, as below:

$$D = \begin{bmatrix} d_{11} & d_{12} & d_{13} \\ d_{12} & d_{22} & d_{23} \\ d_{13} & d_{23} & d_{33} \end{bmatrix} \qquad (10)$$

Note that the tensor D varies with a variety of geometric factors, such as various changes in the direction of the flow, the inclusion of ribs, and changes in thickness and holes. Flows in injection molding are dominated by shear flows. In particular, extension flows are encountered, for example, the contraction flow at gate and nozzle regions, and the fountain flow of the melt front in the cavity. However, the flow velocity direction, the direction of the velocity changes, and the neutral direction of thickness and gradient cannot be directly given from the tensor components. Thus, one is not able to recognize the individual contributions of shear rate and extension rate occurring in the specific channel. This problem has existed for a long time.

It is widely known that the generalized strain rate is not decomposed to determine the individual rate of shear and extension. The present invention therefore proposes the principal shear rate and principal extension rate obtained from the generalized strain rate, containing four steps:

Step 1: Rotation Matrix

The rotation matrix R is a coordinate transfer matrix for the rate-of-deformation tensor from the global coordinate to the principal flow coordinate, as below:

$$R = \begin{bmatrix} t \\ n \\ b \end{bmatrix} \quad (11)$$

where t is the unit tangent vector, n is the unit normal vector, and b is the unit bi-normal vector.

The flow velocity vector indicates the tangent direction of flow streamline, while the direction of velocity changes along the arc of flow streamline dv/ds is the same of the unit normal vector. The bi-normal vector is determined by the tangent and normal vectors.

$$t = \frac{v}{|v|} \quad (12)$$

$$n = \frac{dv/ds}{|dv/ds|} \quad (13)$$

$$b = t \times n \quad (14)$$

Thus, the flow system coordinates consist of the vectors t, n, and b, which are orthogonal, t⊥n, n⊥b, b⊥t. Also, the rotation matrix is an orthogonal matrix, $$RR^T = R^T R = I = \begin{bmatrix} 1 & 0 & 0 \\ 0 & 1 & 0 \\ 0 & 0 & 1 \end{bmatrix} \quad (15)$$

Step 2: Coordinate Transformation

FIG. 1 is a schematic diagram showing the coordinate transformation in accordance with some embodiments of the present disclosure. The rate-of-deformation tensor D is transformed from the global coordinate to the principal flow coordinate:

$$D^* = RDR^T = \begin{bmatrix} d_{11}^* & d_{12}^* & d_{13}^* \\ d_{12}^* & d_{22}^* & d_{23}^* \\ d_{13}^* & d_{23}^* & d_{33}^* \end{bmatrix} \quad (16)$$

where D* is the principal tensor of the tensor D.

Step 3: Decomposition

The principal tensor D* is decomposed to the principal shear matrix S* and the principal extension matrix E*

$$D^* = S^* + E^* \quad (17)$$

$$S^* = \begin{bmatrix} 0 & d_{12}^* & d_{13}^* \\ d_{12}^* & 0 & d_{23}^* \\ d_{13}^* & d_{23}^* & 0 \end{bmatrix} \quad (18)$$

$$E^* = \begin{bmatrix} d_{11}^* & 0 & 0 \\ 0 & d_{22}^* & 0 \\ 0 & 0 & d_{33}^* \end{bmatrix} \quad (19)$$

Step 4: Calculation

Eventually, one can determine the principal shear rate $\dot{\gamma}^*_S$ and the principal extension rate $\dot{\gamma}^*_E$:

$$\dot{\gamma}^*_S = \sqrt{2S^* : S^*} \quad (20)$$

$$\dot{\gamma}^*_E = \sqrt{2E^* : E^*} \quad (21)$$

Two new quantities are used to show the degree of shear and extension variation with respect to flow geometric features. These are based on extensive research of complicated flow phenomena related to the details of extension effect, such as the contraction flow at gate and nozzle regions, and the fountain flow of the melt front in the cavity.

Figure 2:
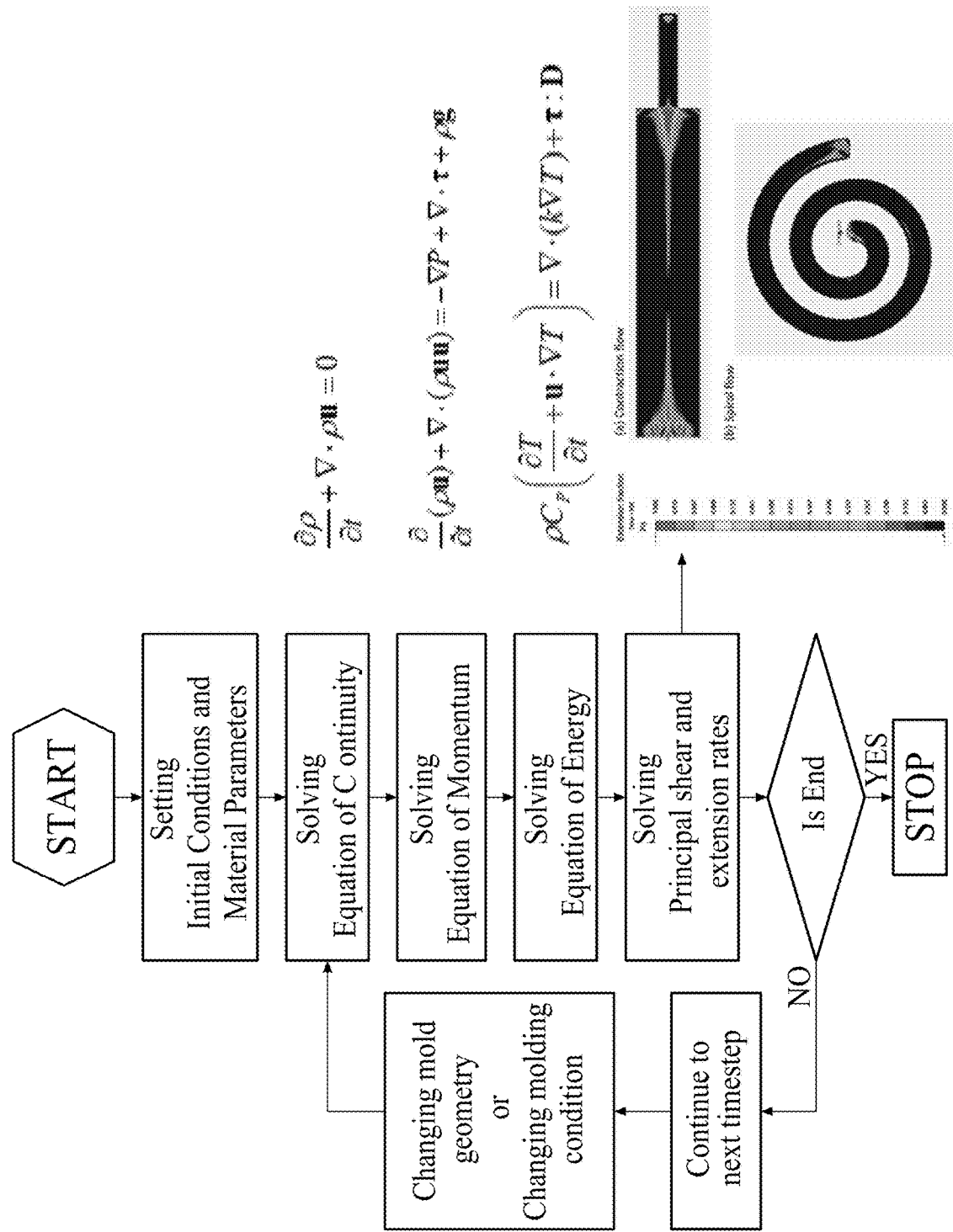
FIG. 2 is a flowchart showing an injection-molding simulation operation in accordance with some embodiments of the present disclosure.

FIG. 2 is a flowchart showing an injection-molding simulation operation in accordance with some embodiments of the present disclosure. Referring to FIG. 2, in injection-molding simulation operations, the governing equations of fluid mechanics that describe the transient flow behaviors are as follows:

$$\frac{\partial \rho}{\partial t} + \nabla \cdot \rho u = 0 \quad (22)$$

$$\frac{\partial}{\partial t}(\rho u) + \nabla \cdot (\rho u u) = \nabla \cdot \sigma + \rho g \quad (23)$$

$$\sigma = -PI + \tau \quad (24)$$

$$\rho C_P \left( \frac{\partial T}{\partial t} + v \cdot \nabla T \right) = \nabla \cdot (k \nabla T) + \eta_S \dot{\gamma}^2 \quad (25)$$

where ρ represents density; u represents the velocity vector; t represents time; σ represents the total stress tensor and τ represents the extra stress tensor; ∇v represents the velocity gradient tensor; g represents the acceleration vector of gravity; P represents pressure; $C_p$ represents specific heat; T represents temperature; k represents thermal conductivity, $\eta_S$ represents shear viscosity, and $\dot{\gamma}$ represents the strain rate.

Solving the governing equations (22)-(25) requires a transient state analysis, which can be performed numerically using a computer (See, for example, Rong-Yeu Chang and Wen-hsien Yang, "Numerical simulation of mold filling in injection molding using a three-dimensional finite volume approach," International Journal for Numerical Methods in Fluids Volume 37, Issue 2, pages 125-148, Sep. 30, 2001; the entirety of the above-mentioned publication is hereby incorporated by reference herein and made a part of this specification). During the transient state analysis, the process variables that change with time are not zero; i.e., the partial derivatives (∂/∂t) in the governing equations (22)-(25) are not considered zero.

The true 3D Finite Volume Method (FVM) is employed due to its robustness and efficiency to solve the transient flow fields in a complex 3D geometrical article. In some embodiments of the present disclosure, the simulation flow in FIG. 2 can be implemented using commercial injection-molding simulation software, Moldex3D (CoreTech System Co. of Taiwan), to facilitate the orientation predictions of the molding resin.

Referring to FIG. 2, in case the extension rate distribution and the shear rate distribution of the molding resin do not meet the product specification, the geometry of the mold cavity and/or the molding condition of the molding machine are changed, and the process is repeated until the extension rate distribution and the shear rate distribution of the molding resin meet the product specification.

Figure 3:
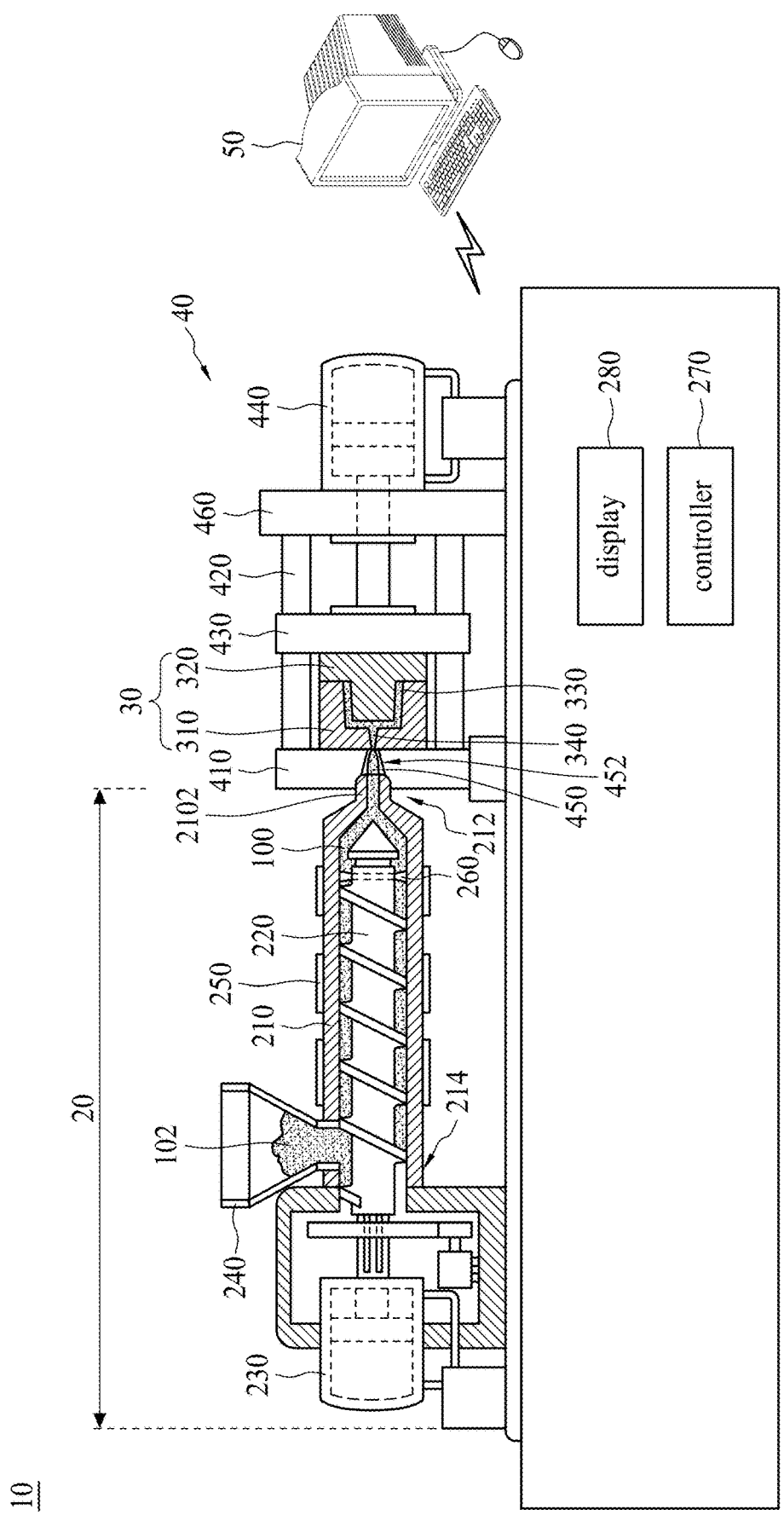
FIG. 3 is a schematic view of an injection-molding apparatus in accordance with some embodiments of the present disclosure.

FIG. 3 is a schematic view of an injection-molding apparatus 10 in accordance with some embodiments of the present disclosure. Referring to FIG. 3, the injection-molding apparatus 10 that can be used to carry out molding includes a molding machine 20, a mold 30, a clamping assembly 40 and a computer 50. The molding machine 20 includes a barrel 210 having a downstream end 212 connected to the mold 30. The mold 30 includes mold halves 310 and 320 to define a mold cavity 330 and a runner 340 in communication with the mold cavity 330.

The clamping assembly 40 is in operative connection with the mold 30 for clamping the mold halves 310 and 320. In some embodiments, the clamping assembly 40 includes a fixed plate 410, a plurality of tie bars 420 mounted on the fixed plate 410, and a moving plate 430 slidably engaged with the tie bars 420 and guided by a driving cylinder 440. The mold half 310 proximal to the barrel 210 is secured on the fixed plate 410, and the mold half 320 distal to the barrel 210 is secured on the moving plate 430 in any suitable manner, wherein the driving cylinder 440 drives the moving plate 430 to open or close the mold 30. In some embodiments, the barrel 210 includes a nozzle 2102 adapted to engage a sprue 450 in the fixed plate 410. In some embodiments, the sprue 450 is in communication with the runner 340 as the mold half 310 is assembled with the fixed plate 410. In some embodiments, the fixed plate 410 may be equipped with a sprue bush 452 including the sprue 450 and receiving the nozzle 2102 during an injection time. A molding material 100 under pressure is delivered to the sprue bush 452 from the nozzle 2102 pressed tightly against the sprue bush 452 in order to deliver the molding material 100 to the sprue 450 during a filling stage of the injection time.

In some embodiments, the clamping assembly 40 further includes an ejector plate 460 mounted with at least one ejector pin (not shown), wherein the moving plate 430 is disposed between the fixed plate 410 and the ejector plate 460. In some embodiments, the ejector plate 460 is fixed on one of the plurality of tie bars 420. In some embodiments, the driving cylinder 440 penetrates the ejector plate 460 and directly connects to the moving plate 430 to open or close the mold 30. After the mold halves 310 and 320 are separated (i.e., the mold 30 is opened), a distance between the moving plate 430 and the ejector plate 460 is reduced, so the ejector pin can penetrate through the ejector plate 460 to push a molded product out of the mold 30.

A screw 220 is mounted for moving within the barrel and is operably connected, at an upstream end 214 opposite to the downstream end 212 of the barrel 210, to a driving motor 230. The molding machine 20 processes material, such as plastic granules 102, by feeding the material through a hopper 240 to the barrel 210 in order to make the material soft and force the molding material 100 into the mold 30 by the use of the screw 220, wherein the phase of the plastic granules 102 is changed from solid to liquid by at least one heater band 250 surrounding the barrel 210. In some embodiments, the molding machine 20 further includes a check valve 260 mounted on the screw 220, wherein the check valve 260 is in tight contact with the barrel 210 during the filling stage, and the check valve 260 is open for allowing the liquid material to flow to the downstream end 212 of the barrel 210 during a packing stage. In some embodiments, if the mold cavity 330 is almost filled with the molding material 100, a packing process proceeds. In some embodiments, the screw 220 rotates and moves toward the upstream end 214 of the barrel 210 during the packing stage.

The injection-molding apparatus 10 further includes a controller 270 for controlling and monitoring the real-time functions of the molding machine 20, and a display 280 for displaying data related to the performance and operation of the molding machine 20 to on-site technicians. In some embodiments, the display 280 is further configured to accept input data from the on-site technicians. In other words, the display 280 is provided with a communications link directly with the controller 270 to provide real-time control of the molding machine 20 by the on-site technicians particularly where the on-site technicians' intervention is required.

In some embodiments, the injection-molding apparatus 10 can further include operation interface communication links among the controller 270, the display 280 and peripheral devices, and a program sequence of operation which allows the operation interface to monitor diagnostic functions of the controller 270 and the molding machine 20, trigger sound and/or light alarms regarding conditions of the molding machine 20, receive performance data from the molding machine 20, and receive input data from the display 280.

The computer 50 is associated with the molding machine 20 and is configured to execute CAE simulation software and transmit at least one simulation result to the controller 270 through a connection such as a hard wire connection or a wireless coupling. In some embodiments, the computer 50 includes a standardized operation system capable of running general-purpose application software for assisting with the analysis of process performance data and for communicating with the controller 270 and the display 280 via communication ports of each.

Figure 4:
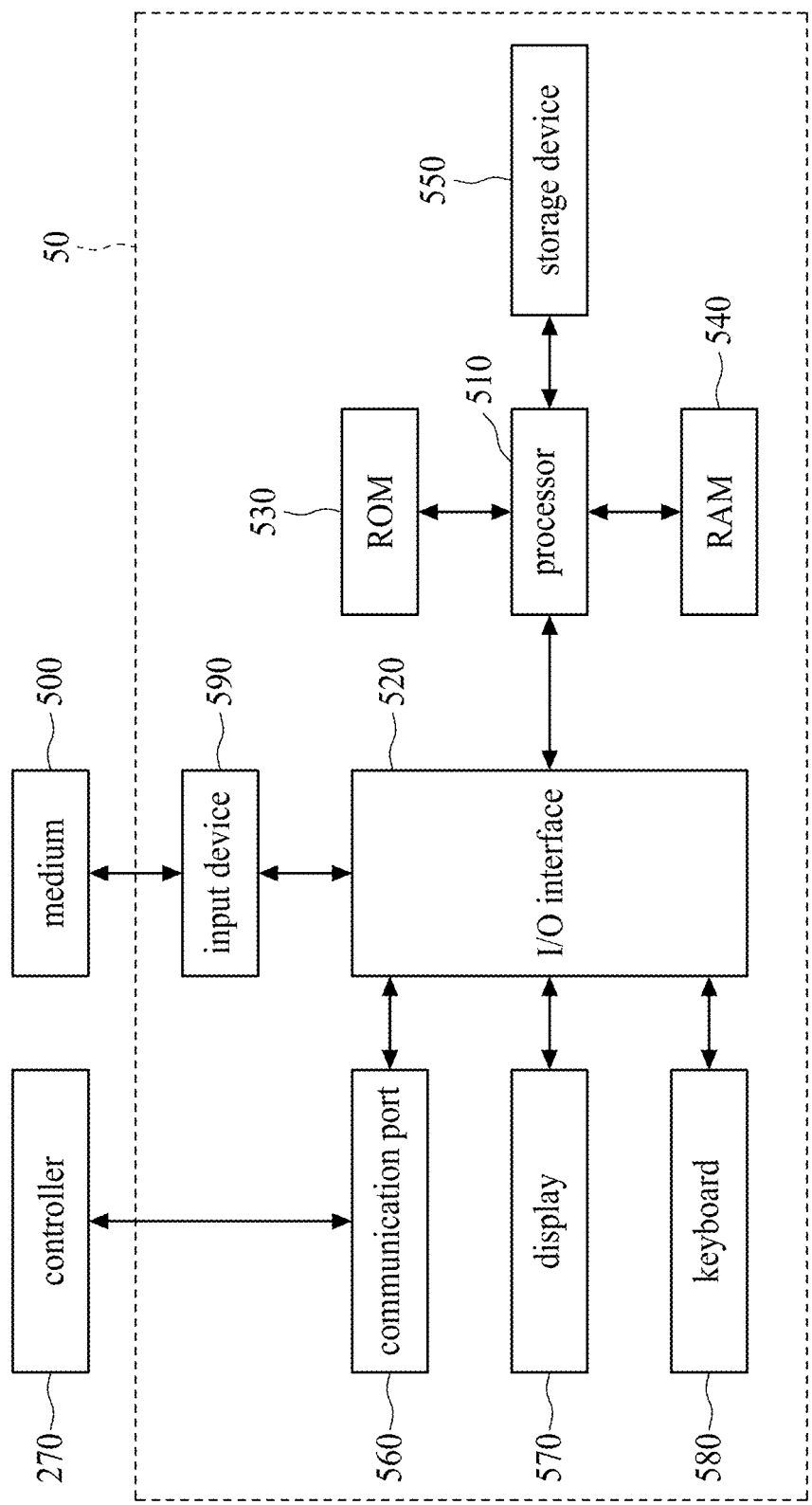
FIG. 4 is a functional block diagram of the computer in FIG. 3.

FIG. 4 is a functional block diagram of the computer 50 in FIG. 3. Referring to FIG. 4, the computer 50 includes a processing module 510 such as a processor adapted to perform a computer-implemented simulation method for use in injection molding, an input/output (I/O) interface 520 electrically coupled to the processing module 510, and memories, which may include a read-only memory (ROM) 530, a random access memory (RAM) 540 and a storage device 550. The ROM 530, the RAM 540 and the storage device 550 are communicatively coupled to the processing module 510.

The computer 50 further includes a communication port 560 associated with the controller 270 of the molding machine 20. The computer 50 may further include one or more accompanying input/output devices including a display 570, a keyboard 580 and one or more other input devices 590. The input devices 590 may include a card reader, an optical disk drive or any other device that allows the computer 50 to receive input from the on-site technicians. In some embodiments, the input devices 590 are configured to input computer instructions (software algorithms) stored in a non-transitory computer-readable medium 500, and the processing module 510 is configured to execute operations for performing a computer-implemented injection-molding simulation method according to the computer instructions. In some embodiments, the processing module 510 reads software algorithms from the other input device 590 or the storage device 550, executes the calculation steps, and stores the calculated result in the RAM 540.

In our present work, the subroutine to calculate the principal shear rate and the principal extension rate has been implemented in commercial injection-molding simulation software, Moldex3D (CoreTech System Co. of Taiwan). Flows in injection molding are dominated by shear flows. In practice, extension flows are encountered, especially the sudden contraction flow. Such geometry is usually found in injection molding for polymer melts flowing through gate and nozzle regions into a mold cavity. A planar contraction flow simulation was performed via Moldex3D. In order to show the extension effect, a new extension indicator can be defined:

$$EF = \frac{(\dot{\gamma}_E^*)^2}{(\dot{\gamma}_S^*)^2 + (\dot{\gamma}_E^*)^2} \quad (26)$$

Figure 5:
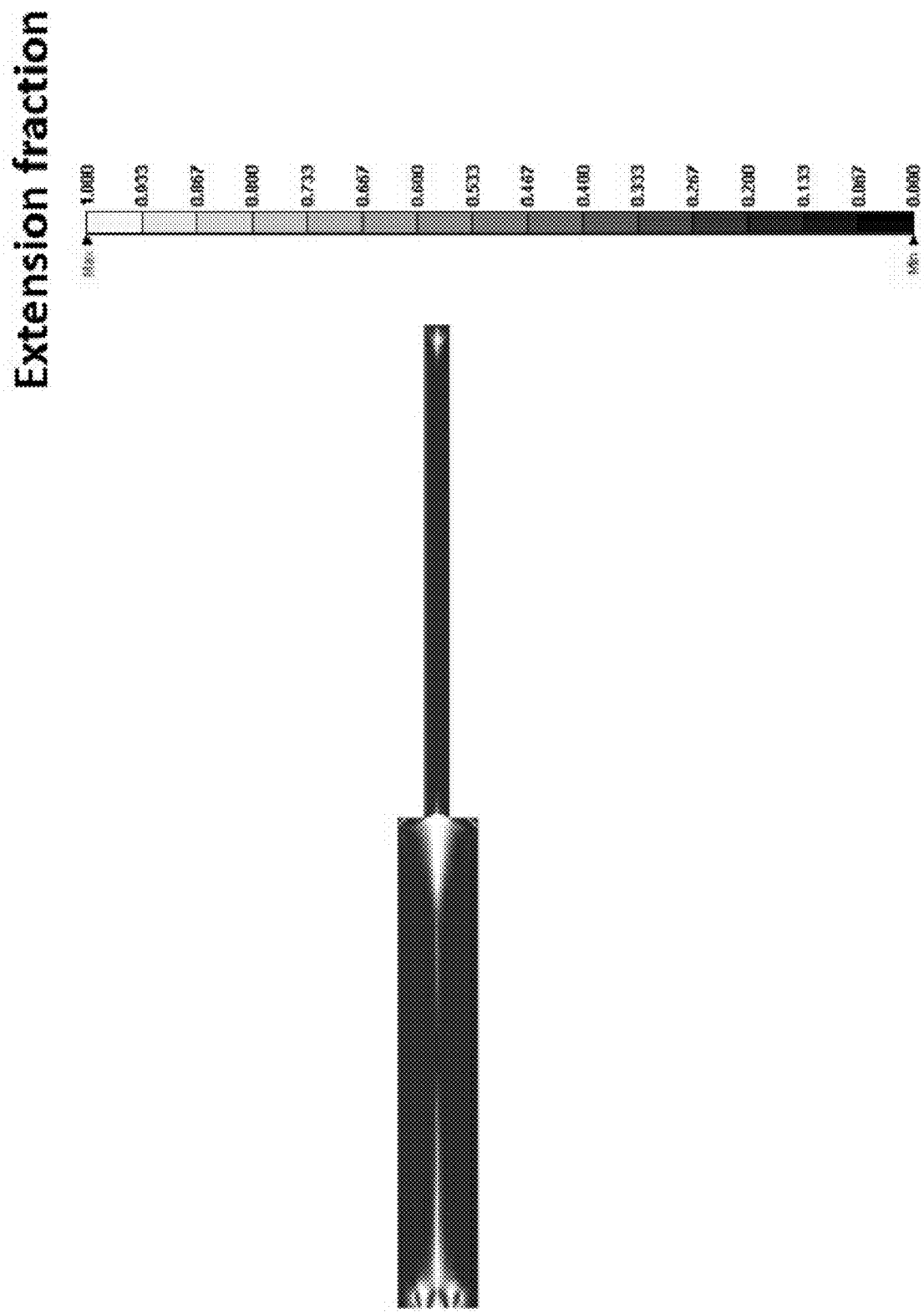
FIG. 5 shows the extension fraction indicator for contraction flow simulation in accordance with some embodiments of the present disclosure.

FIG. 5 shows the extension fraction indicator for contraction flow simulation in accordance with some embodiments of the present disclosure. The grey scale indicates the extension fraction for the fluid, wherein darker tones indicate a weaker extension flow, and lighter tones indicate a stronger extension flow. For the contraction flow with the 4:1 contraction ratio in FIG. 5, the extension near the inlet, the corner and the contraction, the front regions are strong, whereas the others are weak.

Figure 6:
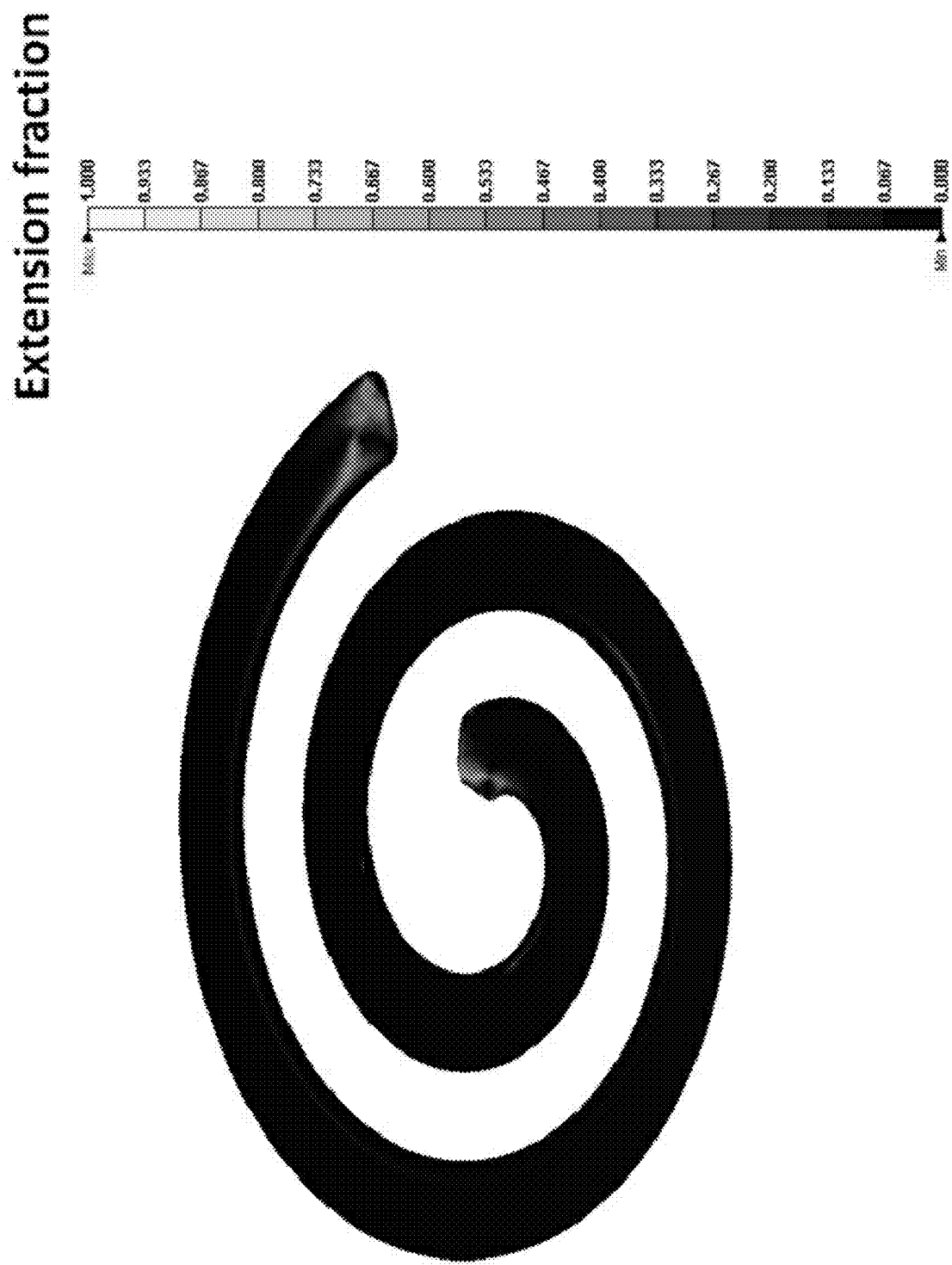
FIG. 6 shows the extension fraction indicator for the spiral flow simulation in accordance with some embodiments of the present disclosure.

FIG. 6 shows the extension fraction indicator for the spiral flow simulation in accordance with some embodiments of the present disclosure. In addition to the spiral flow, it is obvious that the extension is found only at the melt front, and the others are controlled by the shear deformation. Therefore, both the contraction flow simulation and the spiral flow simulation demonstrate that the flows in injection molding are mainly dominated by shear flows and the extension occurs in specific area of thickness-variation. The extension indicator, mentioned above, may be used to predict certain characteristics of complex flows for complex geometric channels.

Figure 7:
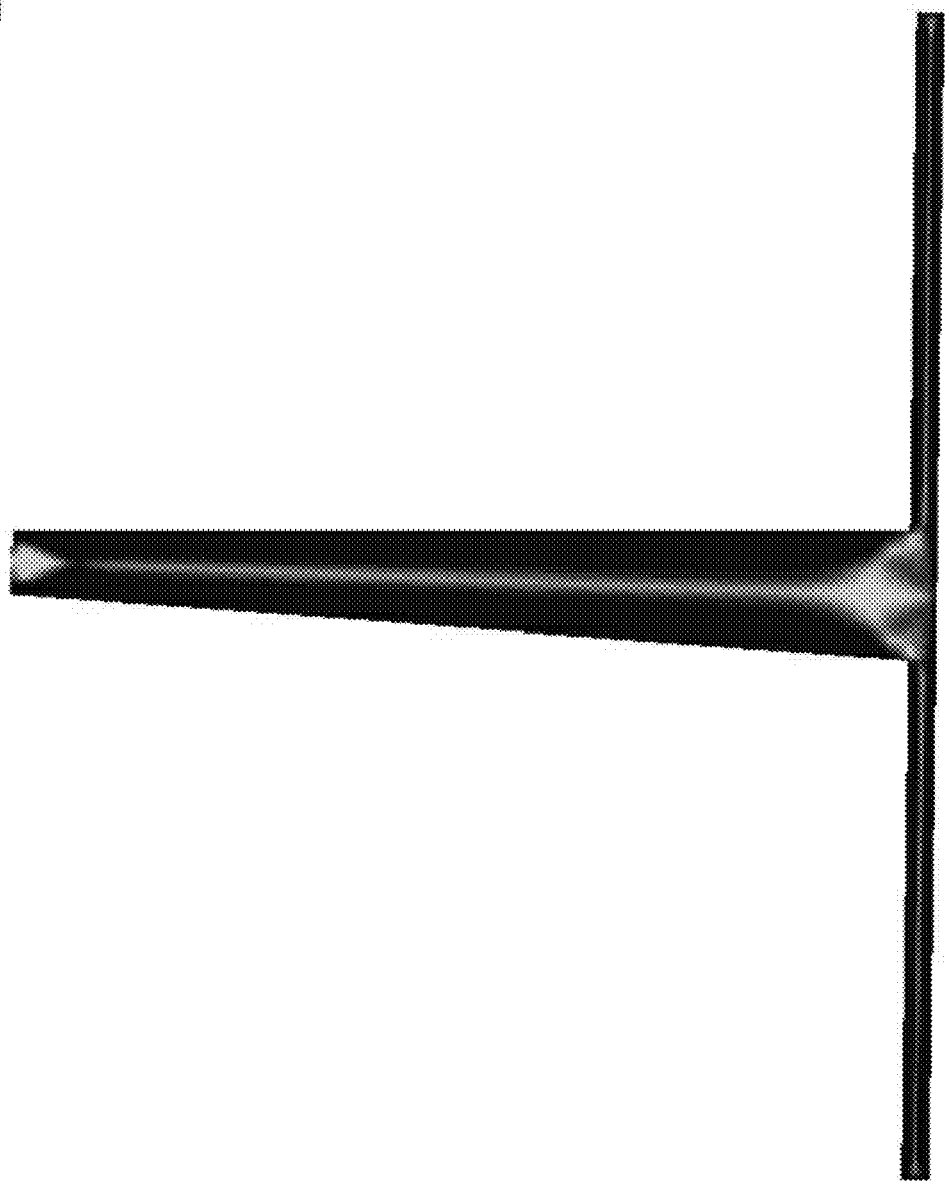
FIG. 7 shows the extension fraction indicator for the overall disk flow simulation in accordance with some embodiments of the present disclosure.

FIG. 7 shows the extension fraction indicator for the overall disk flow simulation in accordance with some embodiments of the present disclosure. It is clear that the higher extension rates occur near the mid-plane of the runner and the cavity, as well as around the flow entrance and the gate (notice that the fluid flowing from the runner turns sharply into the cavity), while the magnitude of the shear rate is very small. Near the wall boundary, the extension rate is nearly zero, whereas the shear rate is quite strong. The flow pattern in the center-gated disk is very complex. Thus, it can be summarized that shear flow dominates near the walls, while a purely extension flow occurs at the centerline. Accordingly, these predicted findings match the general understanding of polymer processing.

The present disclosure provides a molding system for preparing an injection-molded article. The molding system includes a molding machine; a mold disposed on the molding machine and having a mold cavity for being filled with a molding resin; a processing module configured to generate an extension rate distribution and a shear rate distribution of the molding resin in the mold cavity based on a molding condition for the molding machine; and a controller coupled to the processing module. The processing module is configured to generate the extension rate distribution and the shear rate distribution of the molding resin based in part on consideration of a geometry variation of the mold cavity. The controller is configured to control the molding machine with the molding condition using the generated extension rate distribution and the generated shear rate distribution of the molding resin to perform an actual molding process for preparing the injection-molded article.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein, may be utilized according to the present disclosure. Accordingly, the appended claims are intended to include within their scope such processes, machines, manufacture, compositions of matter, means, methods, and steps.

What is claimed is:

1. A molding system for preparing an injection-molded article, comprising:
   a molding machine;
   a mold disposed on the molding machine and having a mold cavity for being filled with a molding resin;
   a processing module configured to generate an extension rate distribution and a shear rate distribution of the molding resin in the mold cavity based on a molding condition for the molding machine; wherein the extension rate distribution and the shear rate distribution of the molding resin are generated based in part on consideration of a geometry variation of the mold cavity; and
   a controller coupled to the processing module and configured to control the molding machine with the molding condition using the generated extension rate distribution and the generated shear rate distribution of the molding resin,
   wherein the controller is configured to control the molding machine to form the injection molded article based on the generated extension rate distribution and the generated shear rate distribution.

2. The molding system of claim 1, wherein the processing module is configured to generate the extension rate distribution and the shear rate distribution of the molding resin based in part on consideration of a velocity distribution of the molding resin in the mold cavity.

3. The molding system of claim 2, wherein the processing module is configured to generate the extension rate distribution and the shear rate distribution of the molding resin in a principal flow coordinate system, and generate the velocity distribution of the molding resin in the mold cavity in a Cartesian coordinate system.

4. The molding system of claim 3, wherein the processing module is configured to generate a rate-of-deformation distribution of the molding resin in the Cartesian coordinate system based in part on consideration of the velocity distribution due to a geometry variation of the mold cavity.

5. The molding system of claim 4, wherein the processing module is configured to transform the rate-of-deformation distribution of the molding resin in the Cartesian coordinate system into a rate-of-deformation distribution of the molding resin in the principal flow coordinate system.

6. The molding system of claim 5, wherein the rate-of-deformation distribution of the molding resin in the Cartesian coordinate system is represented by an expression:

$$D = \begin{bmatrix} d_{11} & d_{12} & d_{13} \\ d_{12} & d_{22} & d_{23} \\ d_{13} & d_{23} & d_{33} \end{bmatrix}$$

wherein the processing module is configured to generate the rate-of-deformation distribution of the molding resin in the principal flow coordinate system by an expression:

$$D^* = RDR^T = \begin{bmatrix} d_{11}^* & d_{12}^* & d_{13}^* \\ d_{12}^* & d_{22}^* & d_{23}^* \\ d_{13}^* & d_{23}^* & d_{33}^* \end{bmatrix}$$

where R and $R^T$ represent coordinate transfer matrixes represented by an expression:

$$R = \begin{bmatrix} t \\ n \\ b \end{bmatrix}$$

$$RR^T = R^T R = I = \begin{bmatrix} 1 & 0 & 0 \\ 0 & 1 & 0 \\ 0 & 0 & 1 \end{bmatrix}$$

where t is a unit tangent vector, n is a unit normal vector, and b is a unit bi-normal vector.

7. The molding system of claim 6, wherein the unit tangent vector, the unit normal vector, and the unit bi-normal vector are represented by an expression:

$$t = \frac{v}{|v|}$$

$$n = \frac{dv/ds}{|dv/ds|}$$

$$b = t \times n$$

where v is a flow velocity vector indicating the tangent direction of flow streamline, and dv/ds is a direction of velocity changes along the arc of flow streamline.

8. The molding system of claim 6, wherein the processing module is configured to divide the rate-of-deformation distribution of the molding resin in the principal flow coordinate system into the extension rate distribution and the shear rate distribution of the molding resin represented by an expression:

$$D^* = S^* + E^*$$

$$S^* = \begin{bmatrix} 0 & d_{12}^* & d_{13}^* \\ d_{12}^* & 0 & d_{23}^* \\ d_{13}^* & d_{23}^* & 0 \end{bmatrix}$$

$$E^* = \begin{bmatrix} d_{11}^* & 0 & 0 \\ 0 & d_{22}^* & 0 \\ 0 & 0 & d_{33}^* \end{bmatrix}$$

$$\dot{\gamma}_S^* = \sqrt{2S^* : S^*}$$

$$\dot{\gamma}_E^* = \sqrt{2E^* : E^*}$$

where $\dot{\gamma}_S^*$ is the shear rate distribution and $\dot{\gamma}_E^*$ is the extension rate distribution.

9. The molding system of claim 6, wherein the processing module is configured to generate an extension fraction (EF) indicator represented by an expression:

$$EF = \frac{(\dot{\gamma}_E^*)^2}{(\dot{\gamma}_S^*)^2 + (\dot{\gamma}_E^*)^2}.$$

10. The molding system of claim 1, wherein the processing module is configured to generate the extension rate distribution and the shear rate distribution of the molding resin based in part on consideration of a rate-of-deformation distribution of the molding resin due to the geometry variation of the mold cavity.

* * * * *